(12) United States Patent
Narwankar et al.

(10) Patent No.: US 8,668,486 B2
(45) Date of Patent: Mar. 11, 2014

(54) EXTRUDER DIE AND RESULTANT FOOD PRODUCT

(75) Inventors: Shalaka Narwankar, Plano, TX (US); Richard James Ruegg, Coppell, TX (US)

(73) Assignee: Frito-Lay North America, Inc., Plano, TX (US)

( * ) Notice: Subject to any disclaimer, the term of this patent is extended or adjusted under 35 U.S.C. 154(b) by 357 days.

(21) Appl. No.: 13/210,126

(22) Filed: Aug. 15, 2011

(65) Prior Publication Data
US 2012/0040078 A1    Feb. 16, 2012

Related U.S. Application Data

(60) Provisional application No. 61/374,147, filed on Aug. 16, 2010.

(51) Int. Cl.
*A21C 3/04* (2006.01)
*B29C 47/08* (2006.01)

(52) U.S. Cl.
USPC ........ 425/376.1; 425/461; 426/451; 426/500; 426/503; 426/509; 426/516

(58) Field of Classification Search
USPC ............... 425/376.1, 461; 426/451, 500, 503, 426/509, 516, 517
See application file for complete search history.

(56) References Cited

U.S. PATENT DOCUMENTS

| | | | | |
|---|---|---|---|---|
| 1,566,705 A | * | 12/1925 | Tanzi | 426/451 |
| 3,001,230 A | * | 9/1961 | Rossi | 425/461 |
| 3,774,266 A | * | 11/1973 | Good | 452/45 |

* cited by examiner

*Primary Examiner* — Yogendra Gupta
*Assistant Examiner* — Joseph Leyson
(74) *Attorney, Agent, or Firm* — Colin P. Cahoon; Brandon V. Zuniga; Carstens & Cahoon, LLP

(57) ABSTRACT

An extruder die designed to produce a spiral corn-based snack food product with consistent, tight spiral pitch and the resultant food product. The extruder die has a center post parallel to the flow path along with three cone-shaped receiving ports arranged in a cloverleaf pattern around the center post. The die has three curved slots on the output side of the die which are in fluid communication with the cone-shaped receiving ports. At the distal end of each of these slots is a semi-circular tip. The tip has a diameter larger than the width of its associated slot. Further, the tip is located at the apex of a cone-shaped receiving port with which it is in fluid communication, thus providing for the highest flow velocity of the extrudate through the tip. The resultant flow profile produces the consistent spiral shape of the snack product produced by the die design described.

11 Claims, 5 Drawing Sheets

EXTRUDER DIE AND RESULTANT FOOD PRODUCT

CROSS-REFERENCE TO RELATED APPLICATIONS

This application claims the benefit of U.S. Provisional Application No. 61/374,147 filed Aug. 16, 2010.

BACKGROUND OF THE INVENTION

1. Technical Field

The present invention relates to an extruder die design and the spiral-shaped snack food produced by such die. The die uses a unique geometry to induce a consistent spiral shape in a corn-based extrudate. The extrudate is then cut, cooked, and typically seasoned and packaged, thus producing a shelf-stable savory snack food.

2. Description of Related Art

Spiral-shaped pasta in various embodiments has long been known in the food industry. Pasta is typically made from unleavened dough of wheat or buckwheat, flour, and water. Rotini is a particular type of spiral pasta that is made in a helix or corkscrew shape. Rotini is typically made on an industrial scale by extrusion of the wet pasta.

Rotini pasta is produced in a shelf stable dry form which is then later cooked in hot water in order to produce a starch-based food. It would be desirable to produce a ready-to-eat savory snack food made from corn that mimics the rotini shape. Unfortunately, the extrusion process used to produce rotini pasta is incompatible with the rheology of a corn-based dough that can be extruded. However, prior art attempts have been made at producing a rotini-shaped corn snack food.

FIG. 1 shows a prior art process of making a spiral-shaped snack food using corn as the prime ingredient. Cleaned, raw, whole corn kernels are first added to cookers 110 to be cooked in water and lime for typically 20-40 minutes at 180-210° F. This solution is then moved to a soak tank 120 where the corn is further soaked for typically 14 hours and proceeds to a corn washer 130 for the removal of hulls. From the corn washer 130, the corn proceeds to a corn mill 140, which mills the corn. The milled corn is then deposited in an extruder 150. The typical extruder 150 used is a piston extruder. The corn is extruded through a die at the output end of the extruder, and the extrudate is cut into pieces by a cutter 160 before the pieces drop into a fryer 170 for cooking in a hot oil. After cooking, the pieces are sent to a seasoning tumbler 180 for seasoning and, finally, packaged.

In the typical embodiment, the water content of the milled corn prior to extrusion is between 48% and 54% by weight. The extrudate further has a lime content of less than 1% by weight. After frying, the water content of the cooked piece is reduced to between 0.3% and 0.55% water by weight.

The extruder die used in the prior art corn snack process described above is similar to a pasta extrusion die and is shown in FIGS. 2a, 2b, 2c, and 2d. The corn-based product 400 produced by the die described with references to FIGS. 2a, 2b, 2c, and 2d is shown in FIG. 4.

Referring to FIGS. 2a, 2b, 2c, and 2d, a single prior art extrusion die is illustrated. This die is typically co-located with several other identical dies at the output end of the extruder. As noted previously, this die design has been used in the prior art to produce a rotini type pasta. It has also been used in attempts to produce a corn snack product that resembles a corkscrew or rotini type pasta; however, many of the internal surfaces of the die required polishing to make it more suitable for use with a corn based dough. Shown in these figures is a single die in isolation having an input side 220 and an output side 210. On the input side 220 the dough enters the die opening, in which is found a center rod 230 with a hollow core and three directing vanes 240. As the dough proceeds through the die generally parallel to the direction of the rod 230 the dough is progressively constricted until it exits the output side 210 of die through three curved slots 260, each of which has a round tip 250. These three slots 260 are in fluid communication with each other and in fluid communication with the openings defined by the vanes 240. FIGS. 2a and 2c show in phantom some of the relative dimensions of the elements previously described.

Use of the die illustrated in FIGS. 2a, 2b, 2c, and 2d with the prior art process for making a corn-based snack product described above will produce a snack product having a somewhat twisted shape. A typical product 400 produced using this prior art die and prior art method is shown in FIG. 4. The piece 400 shown in FIG. 4 can be seen to be slightly irregular in shape with a fairly small diameter 407 and relatively long pitch 409. It would be desirable if the diameter 407 could be increased and the pitch between flights 409 reduced. Stated differently, a piece 400 having a tighter twist pattern extruded through the unique die would results in a product that is more robust with a crunchier mouth feel. Such product should also have a more consistent spiral or more rotini-type look. It has been observed that using the formulation stated above and this prior art die that the end product is typically neither consistent in the pitch of the spirals nor is the pitch small enough to mimic the rotini-like corkscrew appearance.

Consequently, a need exists for an extrusion die that can provide for a smaller pitch to the spirals and a greater diameter with more consistent looking product. Ideally, this should be accomplished by a change in die design without any need for substantial adjustment to the prior art process for making the corn-based product.

SUMMARY OF THE INVENTION

The invention utilizes an extruder die design having a unique configuration. On the input side of the die, the extrudate is routed to three cone-shaped receiving ports arranged in a cloverleaf pattern around a center post. On the output side of the die, the extrudate exits through three curved slots, all of which are in communication with each other at the center of the die. Each of these slots ends with a circular tip that has a diameter that is larger than the width of its associated slot. Each of these tips is also located at the apex of an associated cone-shaped receiving port.

This unique arrangement provides for the highest flow velocity to be delivered at the tip of each slot, thus inducing the spiral effect that produces a consistent corkscrew extrudate. This produces a snack piece having a rotini-like corkscrew appearance with a robust, crunchy mouth feel. Applicants' invention relates to a die design that is compatible with existing equipment and processes for producing a corn-based, savory snack food.

BRIEF DESCRIPTION OF THE DRAWINGS

The novel features believed characteristic of the invention are set forth in the appended claims. The invention itself, however, as well as a preferred embodiment, further objectives and advantages thereof, will be best understood by reference to the following detailed description of illustrative embodiments when read in conjunction with the accompanying drawings, wherein:

DETAILED DESCRIPTION

Figure 1:
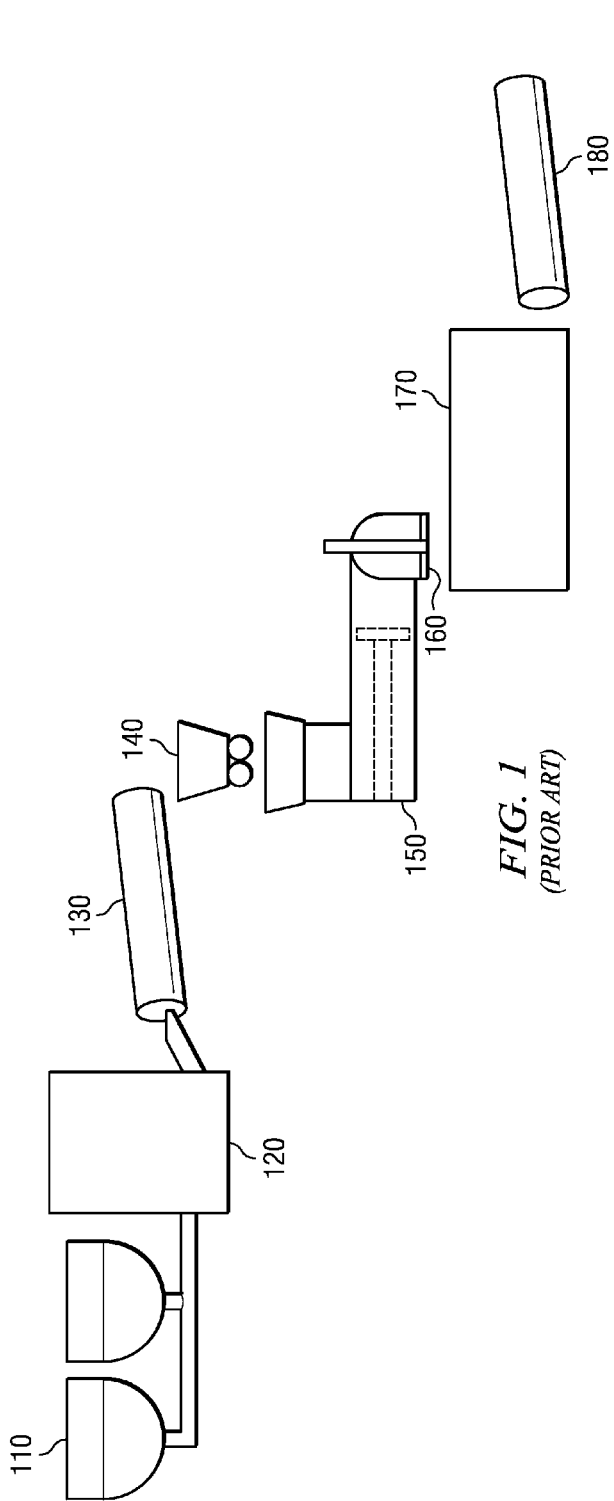
FIG. 1 is a schematic of the process for producing a spiral-shaped, corn-based snack food.

In one embodiment of Applicants' invention, the corn-based dough produced in reference to the discussion of FIG. 1 is used along with the equipment described with reference to FIG. 1. However, a different die design is incorporated into the extruder 150.

Figure 3A:
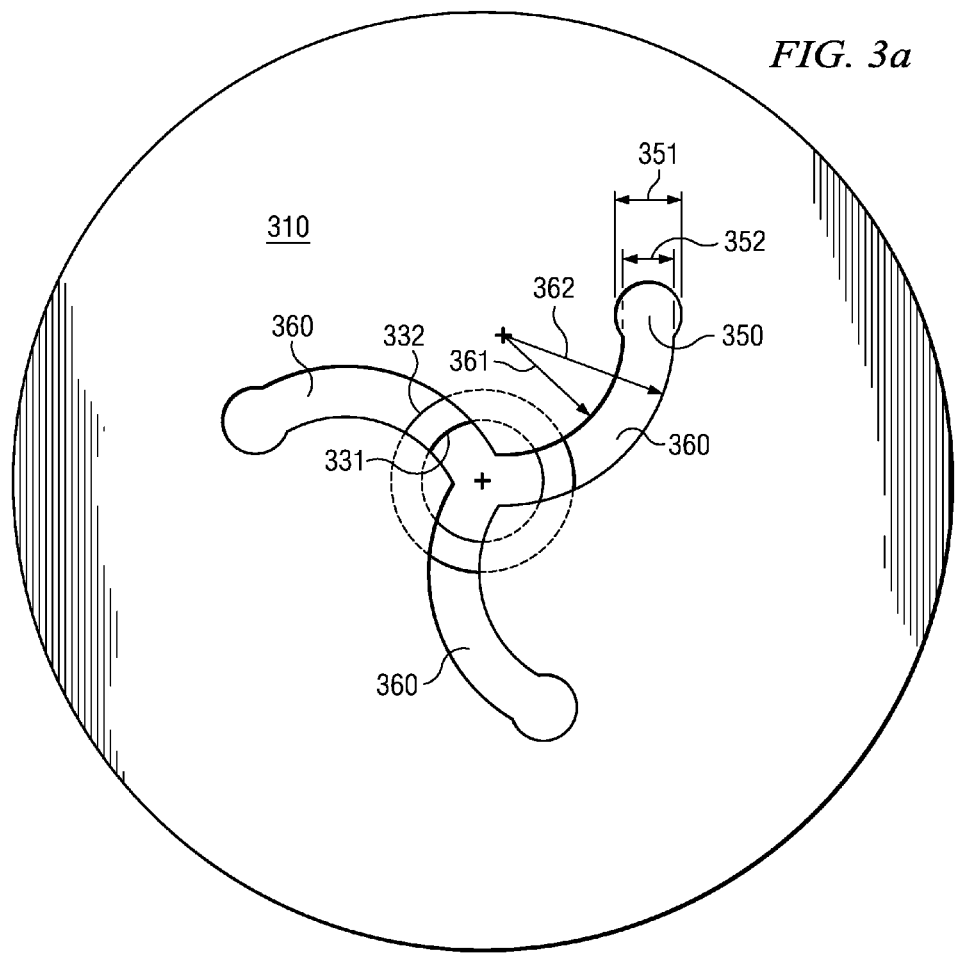
FIGS. 3a, 3b, 3c, 3d, 3e, 3f, and 3g illustrate an extruder die in accordance with one embodiment of the invention.
Figure 3B:
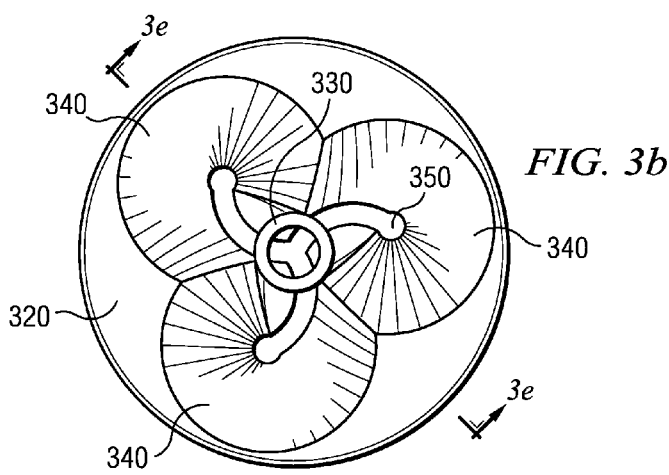
Figure 3C:
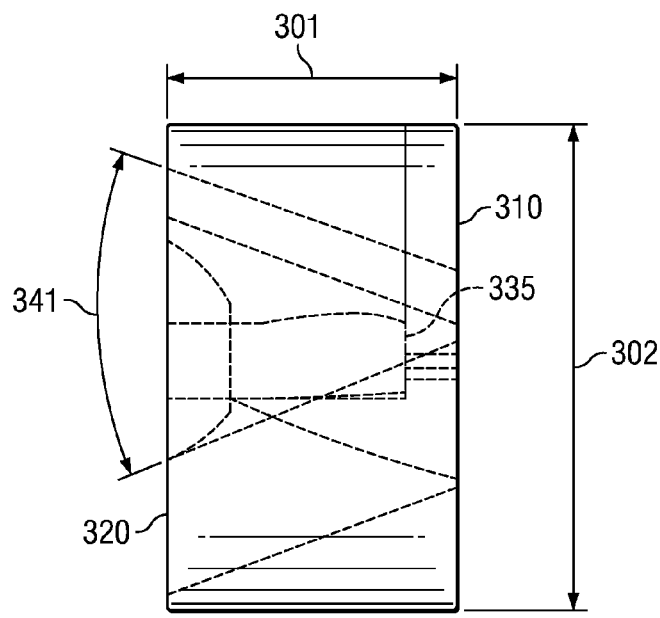
Figure 3D:
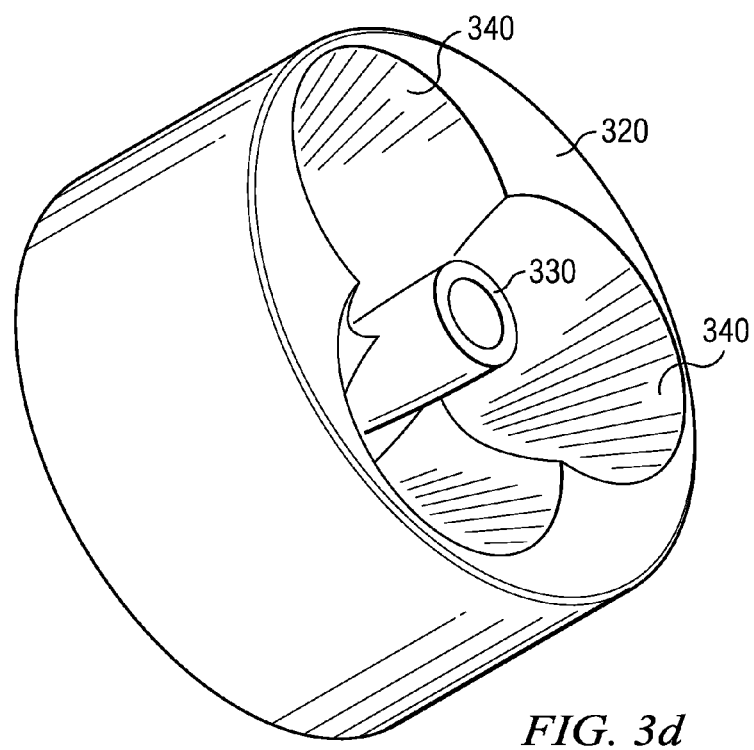
Figure 3E:
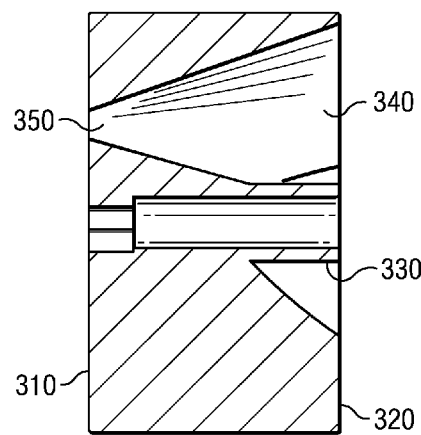
Figure 3G:
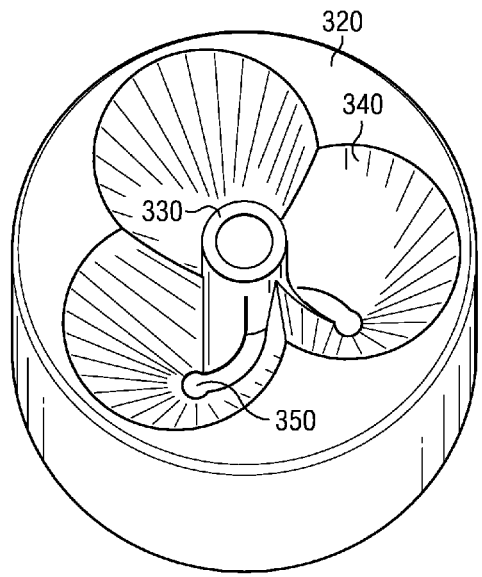
Figure 3F:
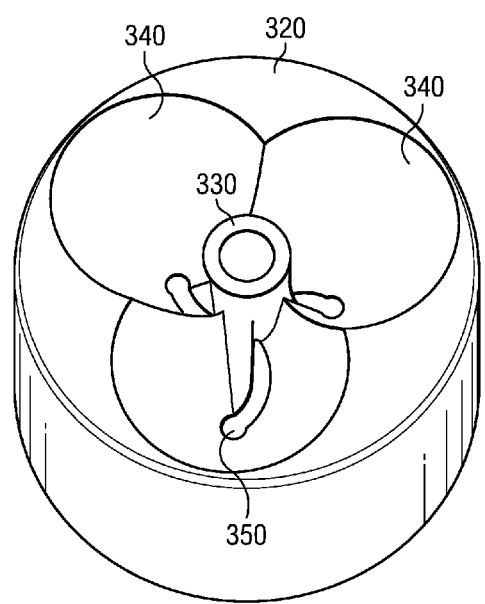

In particular, reference is made to FIGS. 3a, 3b, 3c, 3d, 3e, 3f, and 3g. Shown in these figures is an extruder die design used in one embodiment of Applicants' invention. The die comprises a front face or output side 310 and an input side 320. On the input side 320 can be seen three cone-shaped ports 340 arranged in a cloverleaf pattern around a center post 330. This center post 330 can be either hollow as illustrated or, in an alternative embodiment it can be solid. The input end of the center post 330 (as shown in FIGS. 3d and 3e) is generally coplanar with the exterior surface of the input side 320, but it can also be slightly inset into the die. In the embodiment illustrated, the inside 331 diameter of the center post is 0.120 inches while the outside 332 diameter of the center post is 0.18 inches.

The cones 340 have an opening angle 341 of between 50° and 25°, with a preferable angle 341 of 40°. In a preferred embodiment, the distance 301 from the start of the cones 340 on the input side 320 and the apex or end of the cones on the output side 310 is 0.6 inches. Extrudate enters the die through the cone-shaped ports 340 and proceeds towards the output 310 of the die, thus making the flow of the extrudate generally parallel to the center post 330. It should be noted that the center post terminates at a terminal end 335, as shown in phantom in FIG. 3c, prior to reaching the output side 310. This is also evident in the cutaway view presented in FIG. 3e.

Figure 2A:
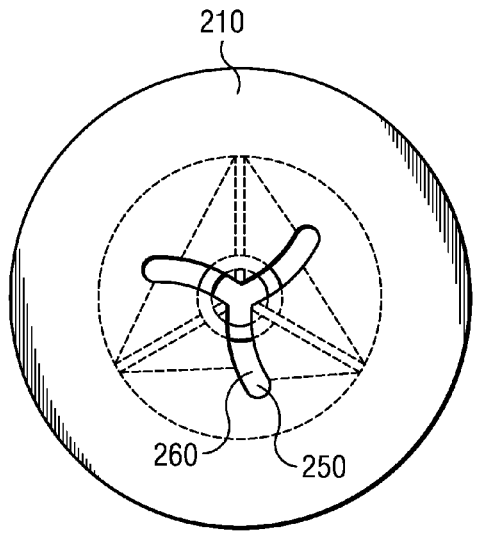
FIGS. 2a, 2b, 2c, and 2d illustrate a prior art extruder die.
Figure 2B:
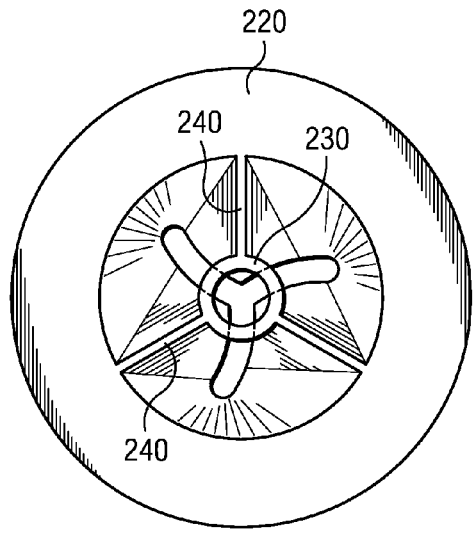
Figure 2C:
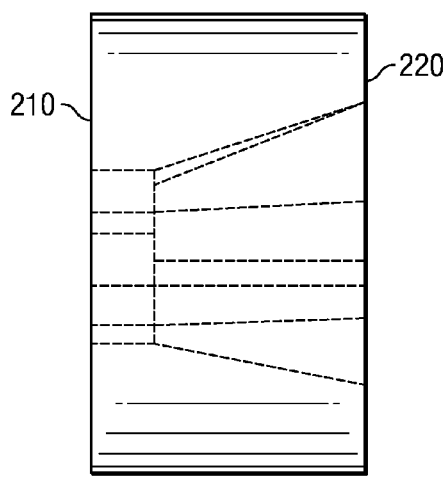

The output side 310 of the die is characterized by three slots 360 which are in fluid communication with each other at the center of the die. It is through these three slots 360 that the extrudate is extruded prior to being cut into pieces. At the distal end or tip of each slot 360 is a circular tip 350. Unlike the tip 250 described in reference to FIG. 2a, this tip 350 is of a slightly greater diameter 351 than the width 352 of its associated slot 360. In a preferred embodiment, the diameter 351 of the tip 350 is 0.065 inches, while the width 352 of the slot 360 is 0.05 inches. The diameter 351 of the tip 350, however, can vary, for example, between 0.051 inches and 0.070 inches depending on the embodiment. The radius that defines the inside radius 361 of each slot in a preferred embodiment is 0.127 inches, while the radius that defines the outside radius 362 of the slot is, in a preferred embodiment, 0.177 inches. In order to accommodate the features with the preferred dimensions provided above, each individual die used with the process described is approximately 1 inch in diameter 302.

Figure 2D:
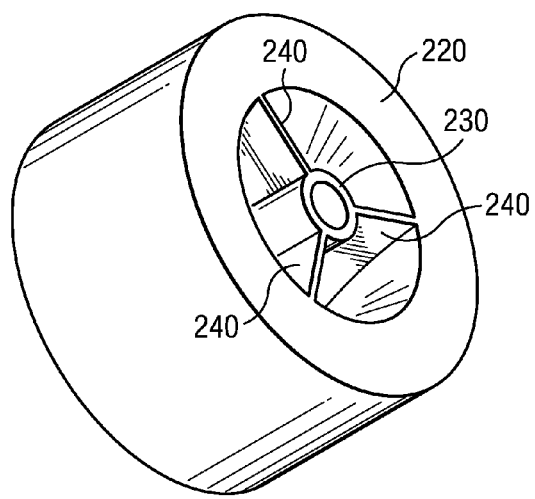

It should also be noted that each tip 350 is located at the apex (output side) of an associated cone 340 with which it is in fluid communication. This feature of Applicants' invention provides that the greatest flow velocity of the extrudate through the die is located at the tips 350 when the extrudate emerges from the die. This high flow rate on the outside of the output side 310 of the die and lower flow rate in the middle thereof is ideal for creating a twisted product. It has also been found that the open design of the input side 320 of the die limits the incidents of corn hulls or other large pieces becoming stuck in or fouling the die, which can occur in a die having vanes 240 that separate the flow path as in the prior art die of FIG. 2d. Consequently, whole grain dough's are suitable for use with Applicants' die. As with the prior art die, Applicants' die is typically arranged in a cluster of two or more identical dies located at the output end of the extruder.

Figure 5:
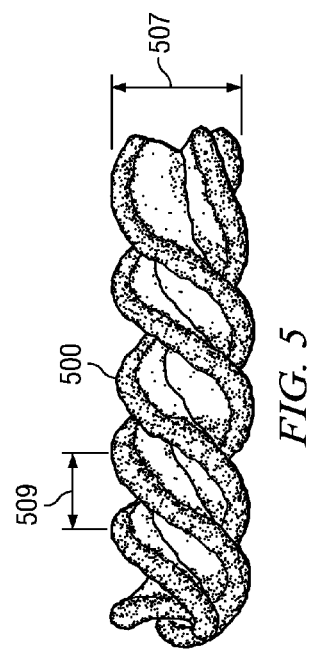
FIG. 5 shows snack food pieces produced by the die of FIGS. 3a, 3b, 3c, 3d, 3e, 3f, and 3g.

The die described with reference to FIGS. 3a, 3b, 3c, and 3d produces a consistent corkscrew-shaped food piece which is then fried and seasoned. FIG. 5 illustrates such food piece 500. As can be seen by comparing FIG. 4 and FIG. 5, the food piece 500 produced by Applicants' invention has a shorter pitch 509 between flights and greater diameter 507 for the entire piece 500. Further, Applicants' invention produces a more consistent looking product with fewer variations as between each individual piece 500 produced. The product 500 produced by Applicants' invention is a bigger, bolder, crunchier product than that found in the prior art with a more consistent and tighter twist.

Figure 4:
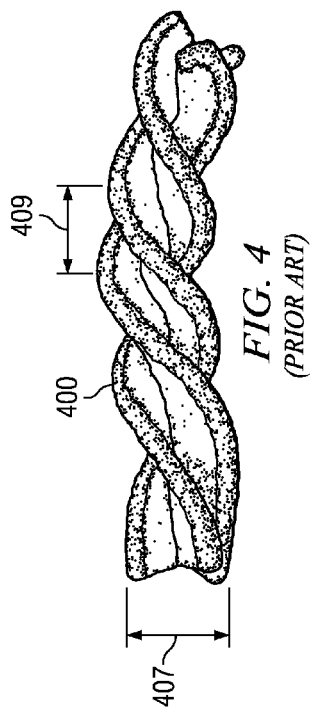
FIG. 4 shows snack food pieces produced by the die of FIGS. 2a, 2b, 2c, and 2d.

The prior art piece 400 shown in FIG. 4 has a diameter 407 that varies between about 0.30 inches and about 0.39 inches, but has been found to have an average diameter 407 of 0.357 inches. The prior art piece 400 has an average pitch of 0.329 inches. This contrast with the product (piece) 500 shown in FIG. 5 and produced by Applicants' invention. This new product 500 ranges in diameter 507 from 0.40 inches to 0.48 inches with an average diameter 507 of 0.431 inches. The average pitch 509 of the new product 500 is 0.247 inches. Thus, the new piece 500 has an average diameter 507 about 21% greater than the prior art piece 400, and has an average pitch 509 about 25% shorter than the prior art piece 400. Further, the new piece 500 has an average diameter to pitch ratio of about 1:0.57, while the prior art piece 400 has an average diameter to pitch ratio of about 1:0.93. One distinguishing feature of the new product 500 over the prior art product 400 is that the new product 500 routinely comprises a diameter pitch ratio of 1:(less than 0.8), which is not the case for the prior art product 400. Any sample of a plurality of pieces 500 would, in a preferred embodiment, result in an average diameter to pitch ratio of 1:(less than 0.8).

While the invention has been particularly shown and described with reference to a preferred embodiment, it will be understood by those skilled in the art that various changes in form and detail may be made therein without departing from the spirit and scope of the invention.

What is claimed is:

1. A food extrusion die having an inlet side and an output side and which directs an extrudate along a flow path through the die, said die comprising:
   a center post parallel to the flow path;
   three cone-shaped receiving ports arranged in a cloverleaf pattern around said center post;
   three curved slots on the output side of the die, wherein said curved slots are in fluid communication with the cone-shaped receiving ports, wherein further each slot terminates at a distal end with a circular tip, said circular tip having a diameter larger than the width of the slot, and wherein further each said circular tip is located at the apex of a cone-shaped receiving post.

2. The die of claim 1 wherein the cone angle is between 50° and 25°.

3. The die of claim 2 wherein the cone angle is 40°.

4. The die of claim 1 wherein the inside radius of each slot is 0.127 inches and the outside radius of each slot is 0.177 inches.

5. The die of claim 4 wherein the slot width is 0.05 inches.

6. The die of claim 1 wherein the diameter of the tip is between 0.051 inches and 0.070 inches.

7. The die of claim 1 wherein the center post is hollow.

8. A method for making a food piece, said method comprising:
  a) forming a dough;
  b) extruding said dough through a die having a center post, three cone-shaped receiving ports arranged in a cloverleaf pattern around said center post, and three curved slots on the output side of the die, wherein said curved slots are in fluid communication with the cone-shaped receiving ports, wherein further each slot terminates at a distal circular tip having a diameter larger than the width of the slot, and wherein further each said circular tip is located at the apex of a cone-shaped receiving post;
  c) cutting the extrudate into individual pieces; and
  d) cooking said extrudate pieces.

9. The method of claim 8 wherein the dough is corn-based.

10. The method of claim 8 wherein the dough is whole grain based.

11. The method of claim 8 wherein the cooking of step d) consists of frying in a hot oil.

* * * * *